April 21, 1970     D. R. RORER     3,507,383
SKIN PACKAGE
Filed June 12, 1969
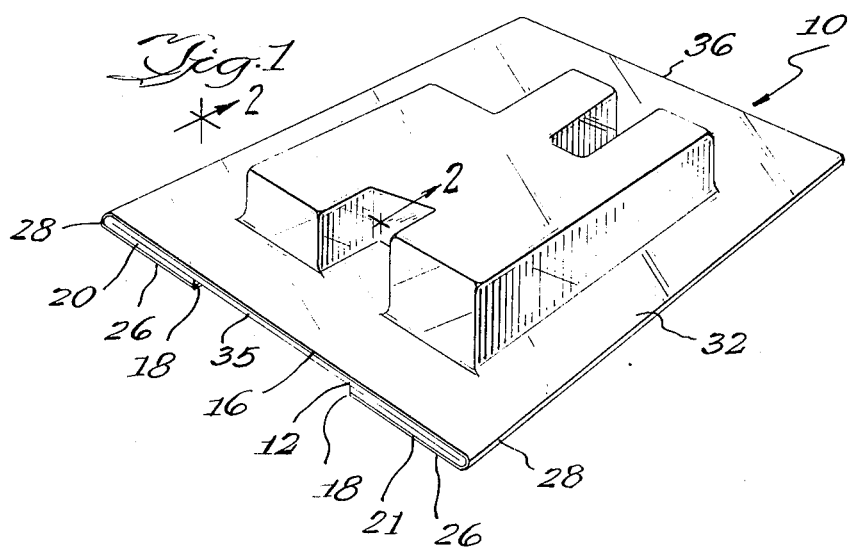
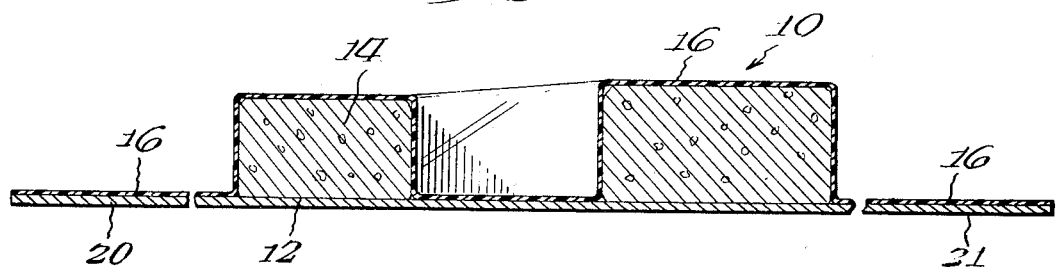
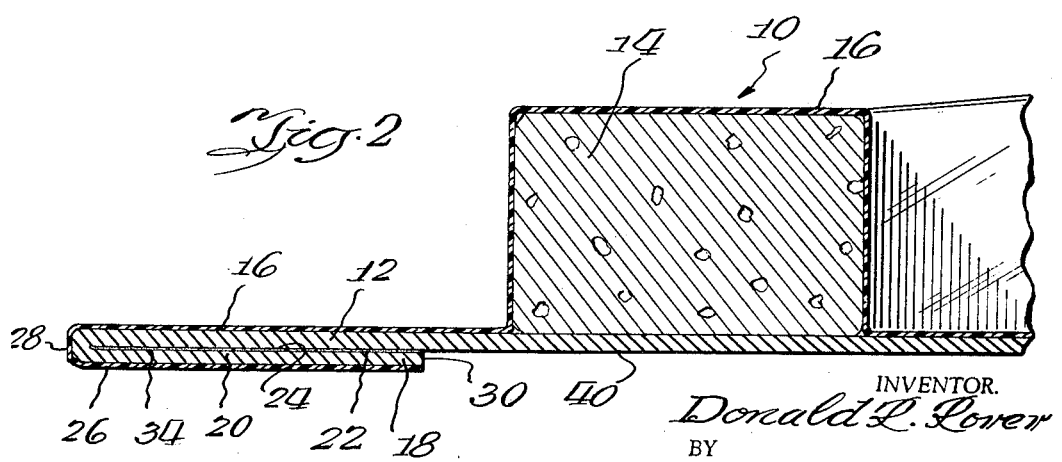
INVENTOR.
Donald R. Rorer
BY
Silverman & Cass
ATTORNEYS 500# United States Patent Office 3,507,383
Patented Apr. 21, 1970

3,507,383
SKIN PACKAGE
Donald R. Rorer, Lake Bluff, Ill., assignor to Stone Container Corporation, Chicago, Ill., a corporation of Illinois
Filed June 12, 1969, Ser. No. 832,753
Int. Cl. B65d 85/72, 31/02, 25/06
U.S. Cl. 206—46   16 Claims

ABSTRACT OF THE DISCLOSURE

A skin package of the type in which an article is supported on a base pad or substrate of plastic or paperboard material encased in a skin of thermoplastic film which has been vacuum-formed or otherwise tightly draped around the article and laminated to the base pad. The skin package utilizes a substrate material of heretofore unusually and unexpectedly thin-gauge paperboard which is rigidified by means of folded-under opposite edges of the substrate secured to the underside of the substrate, said folded-under portions forming return-bent flange formations which include the thermoplastic film being likewise so folded therewith.

FIELD OF THE INVENTION

This invention relates to improvements in a skin package in which a product is encased in a thermoplastic film supported on a base pad or substrate having the film laminated to the base pad, said base pad being an unusually and unexpectedly thin-gauge paperboard material.

DESCRIPTION OF THE PRIOR ART

Skin packages of the general type with which the invention is concerned was relevant subject matter in my Patent No. 3,377,770 for Skin-Packaging Apparatus. Such skin packages are to be distinguished from the so-called "bubble package" or "blister package" with which U.S. Patent Nos. 3,342,320 or 3,104,759 are concerned. These bubble or blister packages are formed from a separate rigid plastic envelope or housing which is secured on a mounting pad or board with the packaged article inside the envelope or housing. Vacuum-forming of the bubble or blister into a skinlike sheath around the encased article and lamination of the bubble or blister to the mounting pad is not involved here as in the case of the familiar skin package.

Heretofore, skin packages have been manufactured using a rather heavy-gauge paperboard stock, such as corrugated or other board suitably porous for drawing a vacuum therethrough. Resorting to heavy-gauge paperboard, such as of the order of ⅛″, ⁵⁄₃₂″ or ³⁄₁₆″ thickness, was the common practice in order to achieve desired support and package rigidity for the carded article. A substantial reduction in the weight of substrate paperboard material, such as in the neighborhood of fifty percent, would have obvious economic and manufacturing advantages.

Skin packages also have been formed where the skin-like film is not vacuum-formed around the product. Rather, it is draped around over the product as a molten film and vacuum forming is not always necessary. In this latter event, an air permeable substrate also is not required so that a non-porous plastic or paperboard substrate can be used.

Prior skin packages employed a flat base pad or substrate over which was laminated the thermoplastic film. The marginal edges of the film generally coincided with the marginal edges of the substrate so that the raw or exposed edge faces of the substrate contributed to an undesirable unsightliness for the skin package. Further, the raw or exposed lateral edges of the substrate also increased the likelihood of the film being peeled away from the substrate during rough handling or undue flexing of the package. This eventuality could result in rupturing of the sealed condition of the package with obvious attendant adverse results.

Obviously then, prior skin packages presented a somewhat critical need for proper and consistently effective adhesion of the film to the base pad. Not only was a properly sealed package desired, but the film was desired to be sufficiently taut over the article encased therein so as to prevent shifting of the article. Such inadvertent shifting of the article could cause rupture of the film especially where the encased article had sharp corners or protuberances or elevations capable of piercing the film.

Finally, although the use of skin-packaging techniques has expanded to include a greater variety of products, as discussed in my Patent No. 3,377,770, it has not, heretofore, successfully included the skin packaging of food or like perishable products. All of the discussed disadvantages of prior skin packages are particularly apropos of food products which must not be tainted in any manner by faulty packaging.

SUMMARY OF THE INVENTION

The primary object of the invention is to provide a skin package which is capable of successfully eliminating the disadvantages hereinabove enumerated and is especially suitable for skin packaging of food products.

An important object of the invention is to provide a skin package which can employ a paperboard base pad or substrate formed of corrugated, chipboard or cardboard, or plastic which is at least about fifty percent lighter in weight or of thinner gauge than heretofore commonly used for skin packaging.

Another object of the invention is to provide a skin package in which an article is supported on the substrate panel or base pad formed of a lightweight, air-permeable paperboard material or non-porous material, said panel or base pad being generally rectangular and having a pair of opposite edge portions folded over and secured to the bottom surface of the package, said folded-over portions including the thermo-plastic film whereby the base pad is rigidified or reinforced in the plane thereof and the plastic film is stretched over the folded-over edges of the base pad and is tauter over the upper surface of the substrate.

Another object of the invention is to provide a skin package having a product sealed thereon with the seal between the substrate and film being protected against inadvertent peeling back of edges of the film from the substrate during transport and handling of the skin package embodying the invention.

Another object of the invention is to provide a method of making a skin package especially suitable for a food or like perishable product.

The foregoing and other advantages of the invention will become apparent from the ensuing disclosure in which a preferred embodiment of the invention is described in detail and illustrated in the accompanying drawings. It is contemplated that minor variations in structural features and arrangements of parts thereof may occur to the skilled artisan without departing from the spirit or sacrificing any of the advantages of the invention.

DESCRIPTION OF THE ILLUSTRATED EMBODIMENT

FIG. 1 is a top perspective view of a skin package embodying the invention.

FIG. 2 is a fragmentary enlarged sectional view taken through said skin package along the line 2—2 of FIG. 1 and in the direction indicated generally.

FIG. 3 is a sectional view taken transversely through said skin package prior to folding under of the flange formations.

In FIG. 1, the skin package embodying the invention is designated generally by the reference character 10. To the extent that said skin package 10 is conventional, same includes a base pad or substrate 12, a packaged article 14 and a skin-like thermoplastic film 16 encasing the article 14 supported on the base pad 12. The film 16 is laminated to the base pad by means of a suitable conditioner or adhesive with which the base pad had been treated prior to forming of the film. It also is known in this art to treat the film so that it will adhere to the substrate during vacuum-forming without using an adhesive.

The pad or substrate 12 is characteristically unique and unusual in that it is specifically intended to be a very lightweight or thin-gauge sheet material of non-porous or air-permeable material, depending upon the manner of making the skin package. I have achieved successful skin-packaging maufacture using much lighter-weight board than heretofore has been the practice, without sacrificing desired support strength and planar rigidity for the package.

As seen in FIGS. 1 and 2, the opposite lateral edges 18 of the substrate have been folded over to provide return-bent, U-shaped flanges 20 and 21 which have been secured to the underside or bottom surface 22 of the base pad. In so doing, each flange 20, 21 is secured with its non-laminated surface 24 in face-to-face contact with said bottom surface 22. In forming each flange 20, 21, the film 16 also has been folded with its associated flange, as indicated at 26, so that the resulting opposite lateral edges 28 of the package 10 have film thereover also. This is to be distinguished from the raw or exposed edge 30 of flange 20 of the substrate as seen in FIG. 2.

The article is representative preferably of a food product such as, meat, cheese, or the like. The film 16 is illustrated stretched tightly across the upper surface 32 of the substrate and the article, a condition which is engendered by the flanges 20, 21 which pull the film along with their being folded under. Raw or exposed substrate edges along the sides 28 are avoided by this invention and hence, inadvertent peeling of the film 16 from the substrate 12 is prevented. The flanges 20, 21 have been shown secured by adhesive 34 to the bottom surface of the substrate, but it is contemplated that staples or other suitable fastening means can be employed.

Notably, the flanges 20, 21 extend continuously from opposite ends 35, 36 of the package and are sufficiently wide so as to contribute materially to the planar rigidity of the package notwithstanding the lightweight substrate material used. The flanges preferably are formed after the skin-packaging operation encasing article 14 on the base pad 12 has been completed. It is then a simple matter to fold and secure the flanges 20, 21 in place after the initial package formation of FIG. 3 is made.

I have achieved successful skin-packaging using .024" thick or 24 point chipboard or boxboard. The tight encasement of the article 14 enables packaging of meat steaks, chops and other meat cuts with remarkable speed and economy of packaging costs. Notwithstanding rough handling thereof, the resulting packages utilizing the invention retained the package seal, and peeling of the film from the substrate was avoided.

Where the product packaged is a frozen food product, it probably will be necessary to use a heated vacuum bed or other suitable means to raise the temperature of the substrate panel sufficiently to prevent undue cooling of the melted plastic film at the time the package is formed. Where the food product is irradiated, this substrate heating procedure would not be required. The invention also would be applicable to any product to be packaged at a reduced temperature.

Referring to FIG. 2 where the flanges are insufficiently wide to abut across the bottom of the substrate, the undersurface of the substrate is exposed, as indicated at 40. Where the package 10 is used for a perishable product, it will be necessary to render this exposed undersurface 40 non-porous or impervious to air so as to prevent deterioration of the packaged product by means of a suitable sealing agent. It is also contemplated that the flanges can be made sufficiently wide to abut on the underside of the package, but obviously, this would increase the cost of the substrate employed since a larger dimensioned substrate panel would be required to permit such foldover of the sides of the panel to obtain abutment of the flanges along a medial line of the package.

The invention also contemplates folding over of all four sides of the substrate so that return-bent flanges are achieved on all sides. This would further rigidify the substrate but would increase the cost of manufacture of the package. Although not shown, the flanges can be twice-folded over to render the same either a three or four-ply construction.

What I claim is:

1. A skin package comprising a base pad of thin highly flexible planar configuration having two pairs of opposite lateral edges, an article supported on a medial body portion of said base pad, a thermoplastic film formed over said article in a skintight encasement, said film having its lateral edges contiguous with the lateral edges of said base pad, said base pad having a top surface and a bottom surface, a pair of return-bent flanges formed along a pair of opposite sides of the package and secured to the bottom surface of the base pad, said folded-over flanges including folded-over portions of the film whereby to rigidify said base pad.

2. A skin package as described in claim 1 in which said flanges are adhesively secured to the base pad.

3. A skin package as described in claim 1 in which said film is stretched tightly around the fold of said flanges.

4. A skin package as described in claim 1 in which the flanges are spaced apart along the bottom of the package, and the intermediate portion of the base pad between said flanges is impervious to air passage.

5. A skin package as described in claim 1 in which said pad has a pair of said flanges likewise along the second pair of opposite edges.

6. A skintight package comprising an air-permeable substrate of flexible, lightweight thin-gauge paperboard, a product supported on the upper surface of said substrate, a thermoplastic film vacuum formed over said product and laminated to the upper surface of said substrate in a sealed-package condition, said substrate and film having a pair of folded-over flanges secured to the underside of the substrate whereby the film overlies the folds of the flanges with the film taut on said substrate and around said folds.

7. A package as described in claim 6 in which said flanges are spaced apart on the bottom of the substrate, and the intermediate portion of the substrate between said flanges is non-porous.

8. A package as described in claim 6 in which said substrate has two pairs of folded-over flanges.

9. A package as described in claim 6 in which said flanges abut on the underside of the package.

10. A package as described in claim 6 in which said product is a food item hermetically sealed on the substrate.

11. A method of making a skin package comprising, carding an article on a substrate of generally rectangular configuration, laminating a sheet of thermoplastic film to said substrate encasing the article in a skinlike formation, then folding under a pair of opposite sides of the substrate to form a pair of return-bent flanges on the underside of the package and securing said flanges to said underside.

12. A method as described in claim 11 in which said flanges are adhesively secured to the substrate.

13. A method described in claim 11 in which the second pair of opposite sides of the substrate are folded to form a second pair of return-bent flanges which are secured to the underside of the substrate.

14. A method as described in claim 11 in which said flanges are spaced apart on the underside of the package, and the intermediate portion of the substrate between said flanges is rendered non-porous to air passage through said intermediate portion.

15. A method as described in claim 11 in which the substrate is heated during laminating of said film.

16. A method as described in claim 11 in which the flanges are sufficiently long to abut along the underside of the package.

References Cited

UNITED STATES PATENTS

| | | | |
|---|---|---|---|
| Re. 26,494 | 12/1968 | Stoker | 206—80 |
| 2,121,053 | 6/1938 | Robinson | 229—53 |
| 3,342,320 | 9/1967 | Stelzer | 206—78 |

WILLIAM T. DIXSON, Jr., Primary Examiner

U.S. Cl. X.R.

206—80; 53—22; 99—171